United States Patent [19]

Dollison et al.

[11] Patent Number: 4,779,485
[45] Date of Patent: Oct. 25, 1988

[54] FLYWHEEL DRIVEN VEHICLE COMPRISING PLURAL FLYWHEEL ENERGIZING MEANS AND A FORWARD REVERSE PLANETARY GEAR SET

[76] Inventors: Lee Dollison, c/o George Spector, 3615 Woolworth Bldg., 233 Broadway; George Spector, 3615 Woolworth Bldg., 233 Broadway, both of New York, N.Y. 10007

[21] Appl. No.: 460,749

[22] Filed: Jan. 24, 1983

[51] Int. Cl.[4] ............................................. F16H 37/02
[52] U.S. Cl. .................................. 74/661; 74/411.5; 74/789; 180/165; 280/217
[58] Field of Search ............... 74/661, 665 G, 655 D, 74/665 C, 665 A, 665 B, 789, 792, 793, 801, 572, 575, 411.5; 180/165; 280/212, 217, 251, 252; 192/17 R

[56] References Cited

U.S. PATENT DOCUMENTS

| 841,239 | 1/1907 | Fouts | 280/217 |
| 1,329,940 | 2/1920 | Wallace | 280/217 X |
| 1,784,419 | 12/1930 | Devito | 280/217 |
| 2,141,233 | 12/1938 | Alexander | 280/217 |
| 2,390,582 | 12/1945 | Gohlke | 74/792 |
| 3,095,766 | 7/1963 | Cox | 74/792 |
| 3,478,622 | 11/1969 | Reid | 74/792 |
| 3,884,501 | 5/1975 | Elias et al. | 280/251 |
| 3,908,483 | 9/1975 | Piquette | 74/792 |
| 4,329,889 | 5/1982 | Hachiya | 180/165 X |
| 4,353,569 | 10/1982 | Molina | 280/217 |

FOREIGN PATENT DOCUMENTS

| 118949 | 9/1944 | Australia | 280/217 |
| 3024960 | 2/1982 | Fed. Rep. of Germany | 180/165 |
| 2343625 | 10/1977 | France | 180/165 |

*Primary Examiner*—Leslie A. Braun
*Assistant Examiner*—Dwight G. Diehl

[57] ABSTRACT

Flywheel drive to operate a rear axle in a wheeled vehicle is provided and consists of a shaft having a rollbar bearing on each end mounted within the wheeled vehicle parallel and near the rear axle, a flywheel affixed to the shaft, a clutch coupled to the shaft, a variable pulley attached to one side of the clutch, means for rotating the shaft and flywheel to a maximum RPM with the clutch disengaged, means for transferring forward motion from the shaft to the rear axle and means for transferring reverse motion from the shaft to the rear axle.

4 Claims, 1 Drawing Sheet

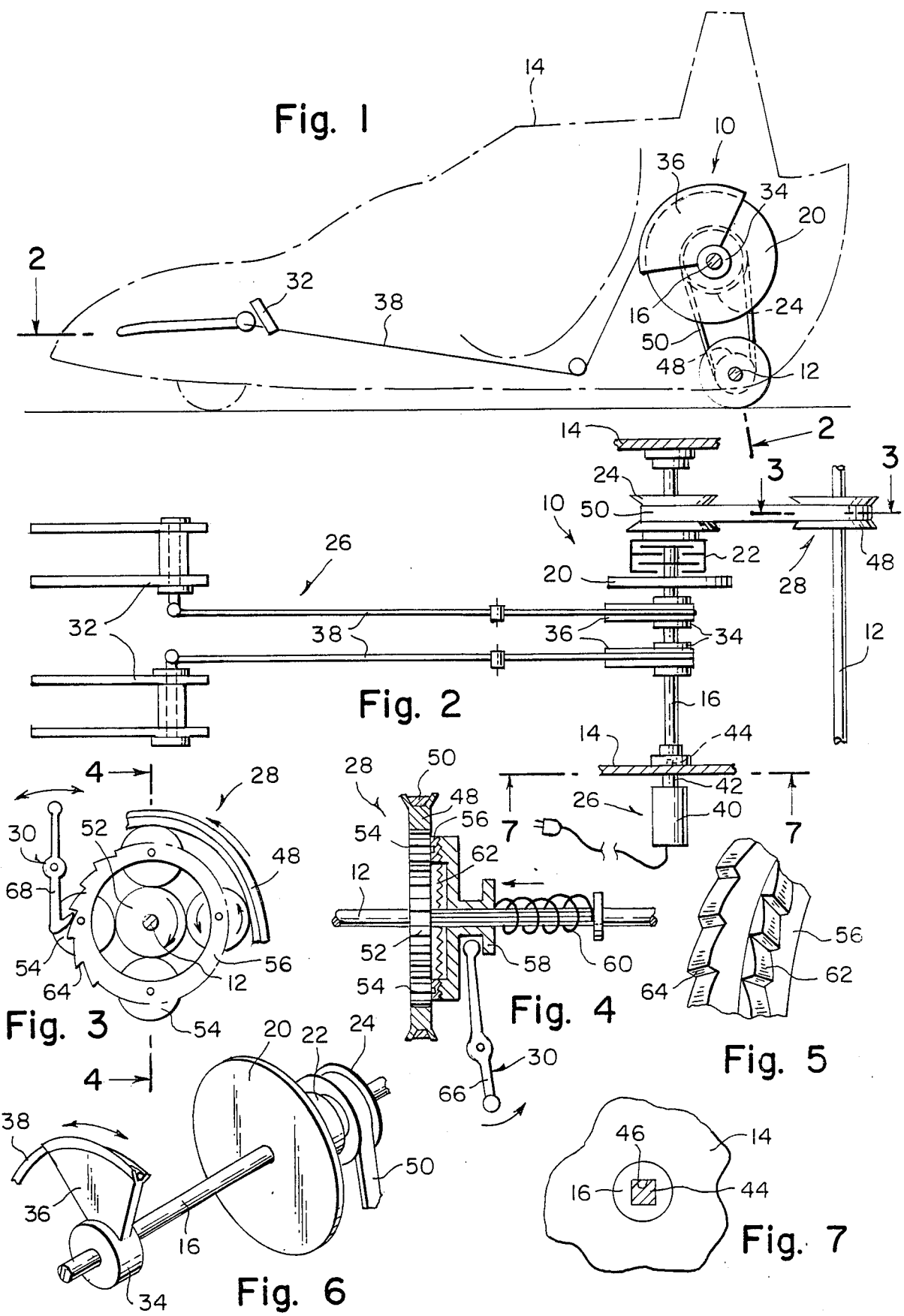

FLYWHEEL DRIVEN VEHICLE COMPRISING PLURAL FLYWHEEL ENERGIZING MEANS AND A FORWARD REVERSE PLANETARY GEAR SET

BACKGROUND OF THE INVENTION

The instant invention relates generally to wheeled vehicles and more specifically it relates to a flywheel drive to operate a rear axle in a wheeled vehicle.

SUMMARY OF THE INVENTION

A principle object of the present invention is to provide a flywheel drive to operate a rear axle in a wheeled vehicle with enough horsepower to be initially stored in the flywheel to give the wheeled vehicle a good driving range.

Another object is to provide a flywheel drive to operate a rear axle in a wheeled vehicle that can supply forward motion to the wheeled vehicle.

An additional object is to provide a flywheel drive to operate a rear axle in a wheeled vehicle that can supply reverse motion to the wheeled vehicle.

A further object is to provide a flywheel drive to operate a rear axle in a wheeled vehicle that is simple and easy to use.

A still further object is to provide a flywheel drive to operate a rear axle in a wheeled vehicle that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated an described within the scope of the appended claims.

BRIEF DESCRIPTION OF THE DRAWING FIGURES

FIG. 1 is a side view in phantom of a wheeled utilizing the vehicle invention.

FIG. 2 is a cross sectional view taken along line 2—2 in FIG. 1.

FIG. 3 is a cross sectional view taken along line 3—3 in FIG. 2.

FIG. 4 is a cross sectional view taken along line 4—4 in FIG. 3.

FIG. 5 is a partial perspective view of the pinion carrier showing reverse and forward gear teeth.

FIG. 6 is a perspective view of a portion of the shaft.

FIG. 7 is a cross sectional view taken along line 7—7 in FIG. 2.

DETAILED DESCRIPTION OF THE PREFERRED EMBODIMENTS

Turning now descriptively to the drawings, in which similar reference characters denote similar elements throughout the several views, FIGS. 1 through 7 illustrates a flywheel drive 10 to operate a rear axle 12 in a wheeled vehicle 14. The flywheel drive 10 basically consists of a shaft 16, a flywheel 20, a clutch 22, a variable pulley 24, a means 26 for rotating the shaft 16 and flywheel 20 to a maximum RPM with the clutch 22 disengaged, a means 28 for transferring forward motion from the shaft 16 to to the rear axle 12 and a means 30 for transferring reverse motion from the shaft 16 to the rear axle 12.

The shaft 16 has a conventional roller bearing at each end mounted within the wheeled vehicle 14 parallel and near the rear axle 12. The flywheel 20 is affixed to the shaft 16 while the clutch 22 is coupled to the shaft 16 with the variable pully 24 attached to one side of the clutch 22.

The means 26 for rotating the shaft 16 and flywheel 20 to a maximum RPM with the clutch 22 disengaged can be accomplished two different ways.

The first way is to utilize a pair of slideable pedals and track assemblies 32, each of which is mounted within the wheeled vehicle 14. A pair of ratcheting hubs 34 having sectors 36 are each mounted to the shaft 16. A pair of cables 38 are each connected between one of the slideable pedals 32 and one of the sectors 36 so that a seated driver (not shown) can operate the pedals 32.

The second way is to utilize an electric motor 40 that is connected to the shaft 16. The electric motor 40 can be plugged into household current and temporarily inserted into the end of the shaft 16 (as shown in FIG. 2). The shaft 42 of the motor 40 can have a square shaped extension 44 to engage a square shaped aperture 46 in the end of shaft 16 (see FIG. 7). The motor 40 can also its power from a battery within the wheeled vehicle 14 from household current.

Once the flywheel 20 has been built up to a maximum RPM, the driver engages the clutch 22 to start off. The variable pulley 24 provides initial slippage and gear reduction for a smooth start and thereafter automatically gives acceleration. Speed is limited by controlling the diameter of the pulley 24 which is done by a twist grip and cable (not shown). The hand controls on steering bar (not shown) could be arranged in typical motorcycle fashion—clutch lever in front of the left grip, brake lever in front of the right grip which twists to control speed. The clutch 22 is controlled by a cable (not shown) leading to the motorcycle clutch lever on the steering bar and the variable pulley 24 could be controlled by a cable (not shown) connected to the motorcycle type twist grip also on the steering bar.

The means 28 for transferring forward motion from the shaft 16 to the rear axle 12 basically consists of an outer gear pulley 48, a continuous drive belt 50, a sun gear 52, four pinion gears 54, a ring shaped pinion carrier 56, a forward gear 58, and a spring 60 as shown in FIGS. 3, 4 and 5.

The continuous drive belt 50 is placed around the variable pulley 24 and the outer gear pulley 48. The sun gear 52 is attached to the rear axle 12 while the pinion gears 54 are placed between the sun gear 52 and the outer gear pulley 48. The ring shaped pinion carrier 56 has a set of side gear teeth 62 and a set of outer gear teeth 64 (see FIG. 5). The pinion gears 54 are rotatably mounted around the ring shaped pinion carrier 56.

The forward gear 58 is splined to the rear axle 12 while the spring 60 has one end affixed to the rear axle 12. The other end of the spring 60 biases the forward gear 58 into the side gear teeth 62 of the ring shaped pinion carrier 56. When the clutch 22 is engaged the continuous drive belt 50 will turn the outer gear pulley 48, the pinion gears 54, the ring shaped pinion carrier 56, the sun gear 52 and the rear axle 12 in the same direction.

The means 30 for transferring reverse motion from the shaft 16 to the rear axle 16 consists of a gear lever 66 and a pawl 68 pivoted about a transverse axis adjacent the perimeter of carrier 56. Counter clockwise rotation of lever 66 (FIG. 3) causes pawl 66 to engage teeth 64. The gear lever 66 disengages the forward gear 58 from the side gear teeth 62 of the ring shaped pinion carrier 56 while the pawl 68 engages the outer gear teeth 64 of the ring shaped pinion carrier 56 holding the ring shaped pinion carrier 56 stationary. When the clutch 22 is engaged the continuous drive belt 50 will turn the outer gear pulley 48 rotating the pinion gears 54, the sun gear 52 and the rear axle 12 whereby the rear axle 12 will turn in a reverse direction from the outer gear pulley 48 (see FIG. 3).

Enough horsepower could be initially stored in the flywheel 20 to give the wheeled vehicle 14 a good range before the driver would have to pedal. The driver could pedal any time he wished, replacing the power in the flywheel 20 as it is used by the wheeled vehicle 14. The driver could pedal at stop lights and signs, storing power for future use. The variable pulley 24 provides for a smooth start, automatic and infinitely variable power transmission which eliminates shifting. Females don't like to shift 10-speed bikes and there's the disadvantage of stopping in a high gear and then starting again with a difficult gear ratio because a person can't shift a 10-speed when stopped. The variable pulley 24 simplifies the operation of the wheeled vehicle 14 and would make it more acceptable to the public.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A flywheel drive for powering a rear axle in a wheeled vehicle comprising:
    (a) a shaft mounted within said vehicle in combination with a rear axle parallel to said shaft;
    (b) a flywheel affixed to said shaft;
    (c) a clutch coupled to said shaft;
    (d) a variable pulley connected to and driven by said clutch when engaged;
    (e) means for rotating the shaft and flywheel to maximum revolutions per minute with the clutch disengaged;
    (f) means for transferring forward motion from the shaft to the rear axle; and
    (g) means for transforming forward motion of said shaft to reverse motion of said axle wherein the means "f" for transferring forward motion from the shaft to the rear axle comprises:
    (a) an outer gear pulley;
    (b) a continuous drive belt placed around the variable pulley and the outer gear pulley;
    (c) a sun gear attached to the rear axle;
    (d) a plurality of pinion gears placed between the sun gear and the outer gear pulley;
    (e) a ring shaped pinion carrier having a set of side gear teeth and a set of outer gear teeth, the pinion gears rotatably mounted around the ring shaped pinion carrier;
    (f) a forward gear with teeth adapted to engage said side gear splined to the rear axle; and
    (g) a spring having one end affixed to the rear axle while other end biases the forward gear into the side gear teeth of the ring shaped pinion carrier so that when the clutch is engaged the continuous drive belt will turn the outer gear pulley; the pinion gears, the ring shaped pinion carrier, the sun gear and the rear axle in the same direction.

2. A flywheel drive to operate a rear axle in a wheeled vehicle as recited in claim 1, said means ("g") for transforming forward motion from the shaft to reverse motion of said rear axle comprises:
    (a) a gear lever that disengages the forward gear from the side gear teeth of the ring shaped pinion carrier; and
    (b) a pawl pivoted about a transverse axis adjacent said carrier engages the outer gear teeth of the ring shaped pinion carrier when said side gear teeth are disengaged holding the ring shaped pinion carrier stationary so that when the clutch is engaged the continuous drive belt will turn the outer gear pulley rotating the pinion gears, the sun gear and the rear axle whereby the rear axle will turn in a reverse direction from the outer gear pulley.

3. Flywheel drive to operate a rear axle in a wheeled vehicle as recited in claim 1, wherein the means for rotating the shaft and flywheel to maximum revolutions per minute with the clutch disengaged comprises:
    (a) a pair of slideable pedals and track assemblies, each of which is mounted within the wheeled vehicle;
    (b) a pair of hubs having sectors, each of which is mounted to the shaft; and
    (c) a pair of cables, each of which is connected between one of the slideable pedals and one of the sectors so that a seated driver can operate the pedals.

4. Flywheel drive to operate a rear axle in a wheeled vehicle as recited in claim 1, wherein the means for rotating the shaft and flywheel to a maximum revolutions per minute with the clutch disengaged is an electric motor that is connected to the shaft.

* * * * *